United States Patent
Wang et al.

(10) Patent No.: US 8,867,865 B2
(45) Date of Patent: Oct. 21, 2014

(54) POINT SET MATCHING WITH OUTLIER DETECTION

(71) Applicant: Seiko Epson Corporation, Tokyo (JP)

(72) Inventors: Jinjun Wang, San Jose, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 13/712,222

(22) Filed: Dec. 12, 2012

(65) Prior Publication Data

US 2014/0133762 A1 May 15, 2014

Related U.S. Application Data

(60) Provisional application No. 61/726,471, filed on Nov. 14, 2012.

(51) Int. Cl.
*G06K 9/54* (2006.01)
*G06K 9/62* (2006.01)

(52) U.S. Cl.
CPC .................................. *G06K 9/6201* (2013.01)
USPC .......................................... 382/305; 382/277

(58) Field of Classification Search
CPC .................. G06T 7/0093; G06T 2207/20076; G06T 2207/20144; G06T 7/401; G06T 2207/20016; G06T 2207/20141; G06T 7/0087; G06K 9/34; G06K 9/342; G06K 9/00228; G06K 9/6224; G06K 9/6267
USPC .................................................. 382/305, 277
See application file for complete search history.

(56) References Cited

U.S. PATENT DOCUMENTS

| | | | |
|---|---|---|---|
| 6,556,705 B1 * | 4/2003 | Shalom | 382/154 |
| 8,160,880 B2 | 4/2012 | Albrecht et al. | |
| 8,538,138 B2 * | 9/2013 | Krishnan et al. | 382/154 |
| 2008/0298646 A1 * | 12/2008 | Wennergren | 382/124 |
| 2009/0080774 A1 * | 3/2009 | Lin et al. | 382/176 |
| 2010/0157322 A1 * | 6/2010 | Conlon | 358/1.2 |
| 2010/0310182 A1 | 12/2010 | Kkroepfl et al. | |
| 2011/0012898 A1 * | 1/2011 | Krishnan et al. | 345/419 |
| 2012/0063679 A1 | 3/2012 | Cutzu et al. | |
| 2012/0148162 A1 * | 6/2012 | Zhang et al. | 382/195 |
| 2012/0251003 A1 * | 10/2012 | Perbet et al. | 382/173 |
| 2012/0301032 A1 * | 11/2012 | Kawanishi et al. | 382/190 |
| 2012/0327172 A1 * | 12/2012 | El-Saban et al. | 348/14.02 |
| 2013/0071016 A1 * | 3/2013 | Omer et al. | 382/164 |
| 2013/0226548 A1 * | 8/2013 | Beck et al. | 703/11 |

OTHER PUBLICATIONS

Viklands, T., "Algorithms for the Weighted Orthogonal Procrustes Problem and other Least Squares Problems", Ph. D. Thesis, Umei University, Department of Computing Science, Sweden, 2006.

(Continued)

*Primary Examiner* — Jingge Wu

(57) ABSTRACT

Aspects of the present invention include point set matching systems and methods. In embodiments, a tree model is used to find candidate matching locations for a set of query points. In embodiments, a similitude transform is assumed, and the parameters are separately solved to reduce computation complexity. In embodiments, the dominant scaling ($\alpha$) and rotation (R) parameters are obtained by identifying a maximum in an accumulator space. A translation (t) matrix is calculated in another 1D accumulator space. With the obtained similitude transform, outliers can be reliably detected. This two-stage approach reduces the complexity and calculation time of determining a similitude transform and increases the accuracy and ability to detect outliers.

20 Claims, 11 Drawing Sheets

(56) References Cited

OTHER PUBLICATIONS

Duda, R., et al., "Use of the Hough Transformation to Detect Lines and Curves in Pictures", Comm. ACM, vol. 15, No. 1, pp. 11-15, Jan. 1972.

Everson, R., "Orthogonal, but not Orthonormal, Procrustes Problems", Advances in computational Mathematics, Mar. 12, 1997, 1998—Citeseer.

Fei-Fei, L., et al., "Learning Generative Visual Models from Few Training Examples: An Incremental Bayesian Approach Tested on 101 Object Categories", Conference on Computer Vision and Pattern Recognition Workshop, Jun. 2-27, 2004. CVPRW '04.

Fergus, R., et al., "Object class recognition by unsupervised scale-invariant learning", Conference on Computer Vision and Pattern Recognition, 2003. Proceedings. 2003 IEEE Computer Society, pp. 264-271, vol. 2, Jun. 18-20, 2003.

Holum, A.D., et al., "Combining Generative Models and Fisher Kernels for Object Recognition", Tenth IEEE International Conference on Computer Vision, 2005. ICCV 2005, Oct. 17-21, vol. 1, pp. 136-143.

Hoshyar, A., et al., "Smart Access Control with Finger Vein Authentication and Neural Network", Journal of American Science, 2011; 7(9): pp. 185-191.

Kim, J., et al., "Asymmetric Region-to-Image Matching for Comparing Images with Generic Object Categories", Proceedings of the IEEE Conference on Computer Vision and Pattern Recognition (CVPR), Jun. 2010.

Weber, M., et al., "Towards Automatic Discovery of Object Categories", Proceedings of IEEE Conference on Computer Vision and Pattern Recognition, 2000, vol. 2., pp. 101-108.

Miura, N., et al., "Feature extraction of finger-vein patterns based on repeated line tracking and its application to personal identification", Machine Vision and Applications, (2004) 15: pp. 194-203, Springer-Verlag Jul. 21, 2004.

Ng, A., et al., On Discriminative vs. Generative classifiers: A comparison of logistic regression and naive Bayes, pp. 841-848, vol. II, 2002 Massachusetts Institute of Technology, 2002.

Nister, D., et al., "Scalable Recognition with a Vocabulary Tree", Center for Visualization and Virtual Environments. Department of Computer Science, University of Kentucky, (CVPR 2006).

Sivic, J., et al., "Video Google: A Text Retrieval Approach to Object Matching in Videos" Proceedings of the Ninth IEEE International Conference on Computer Vision (ICCV 2003) 2-Volume Set.

Tao, H., et al., "Non-orthogonal Binary Subspace and its Applications in Computer Vision", Tenth IEEE International Conference on Computer Vision, (ICCV 2005), pp. 864-870, vol. 1, Oct. 17-21, 2005.

Viola, P., et al., "Rapid Object Detection using a Boosted Cascade of Simple Features", Proceedings of the 2001 IEEE Computer Society Conference on Computer Vision and Pattern Recognition, (CVPR 2001), 1,1-511-1-518 vol. 1.

Weber, M., et al., "Unsupervised Learning of Models for Recognition", Computer Vision—ECCV 2000 Lecture Notes in Computer Science vol. 1842, 2000, pp. 18-32, SpringerLink.

Yang, G., et al., "Finger Vein Recognition Based on a Personalized Best Bit Map", Sensors 2012, 12, 1738-1757, MDPI Open Access Journals.

Yu, Cheng-Bo, et al., "Finger-Vein Image Recognition Combining Modified Hausdorff Distance with Minutiae Feature Matching", Journal of Biomedical Science and Engineering Aug. 1, 2009—Springer.

Yang, J., et al., "A Novel Finger-Vein Recognition Method with Feature Combination", 16th IEEE International Conference on Image Processing (ICIP), Nov. 7-10, 2009, pp. 2709-2712.

Song, W., et al., "A Finger-vein verification system using a mean curvature", Pattern Recognition Letters 32 (2011) pp. 1541-1547, Elsevier.

Wang, L., et al., "Minutiae Feature Analysis for Infrared Hand Vein Pattern Biometrics", Elsevier, Pattern Recognition 41 (2008), pp. 920-929, The Journal of the Pattern Recognition Society.

Grabner, H., et al. "Eigenboosting: Combining Discriminative and Generative Information", IEEE Conference on Computer Vision and Pattern Recognition, pp. 1-8, Jun. 17-22, 2007.

Liu, M., et al., "Towards Dynamic Object Detection Using Key-point Matching and Super-pixel Segmentation", 2010—robots-at-home. acin.tuwien.ac.at.

Felzenszwalb, P., et al., "Efficient Graph-Based Image Segmentation", International Journal of Computer Vision 59 (2), 167-181, 2004.

* cited by examiner

500

```
┌─────────────────────────────────────────────────┐
│ Use dominant scale and rotation values and inlier point │─ 505
│         to project a set of query points        │
└─────────────────────────────────────────────────┘
                        │
                        ▼
┌─────────────────────────────────────────────────┐
│ Select a set of query points that are within a threshold │
│   distance of the corresponding projection points │─ 510
│      (hereinafter, the set of inlier points)    │
└─────────────────────────────────────────────────┘
                        │
                        ▼
┌─────────────────────────────────────────────────┐
│   Use selected set of inlier points to solve for the │─ 515
│              translation matrix (*t*)           │
└─────────────────────────────────────────────────┘
                        │
                        ▼
┌─────────────────────────────────────────────────┐
│  Output translation matrix (*t*) (and outlier point(s))  │─ 520
└─────────────────────────────────────────────────┘
```

FIGURE 5

POINT SET MATCHING WITH OUTLIER DETECTION

CROSS-REFERENCE TO RELATED APPLICATION

This application claims the priority benefit under 35 USC §119(e) to commonly assigned and U.S. Patent Application No. 61/726,471, filed on Nov. 14, 2012, entitled "Visual Recognition Using Joint Discriminative and Generative Tree Model," and listing as inventors Jinjun Wang and Jing Xiao. The aforementioned patent document is incorporated by reference herein in its entirety.

BACKGROUND

1. Field of Invention

The present patent document is directed towards systems and methods for point set matching.

2. Description of the Related Art

Point set matching has been a fundamental problem in many applications. These applications include stereo matching, video stabilization, motion estimation, image registration, object detection, and so forth. Although point set matching is important in many applications, it suffers from some significant issues.

There are at least four significant issues with the point set matching problem. As its name implies, point set matching involves matching query points to database points. Thus, one of the first issues is how to construct matching point pairs.

The second issue involves the problem of outlier points, particularly if there is a high ratio of matching pairs that are actually outliers. Outlier points can have a dramatic negative affect on the resultant transformation obtained from the point set matching process. Robust estimation has been a popular method to deal with outliers, and is reported to be reliable when less than 30% point pairs are outliers. Also, sampling-based methods, such as RANSAC or LMedS, have been used to attempt to handle a large ratio of outliers given sufficient number of sampling.

However, these prior approaches have limitations—especially when dealing with the third issue of point set matching. The third issue involves situations in which query points may have multiple candidate matching points in the database. These prior approaches cannot adequately handle such situations.

Finally, prior approaches to the point set matching problem have been computationally complex. As the number of matched points increased, the computation time and complexity can significantly increase.

Accordingly, systems and methods are needed that can address these issues and produce better results when performing point set matching.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

FIG. 5 depicts a method for obtaining a translation matrix according to embodiments of the present invention.

DESCRIPTION OF THE PREFERRED EMBODIMENTS

Figure 1:
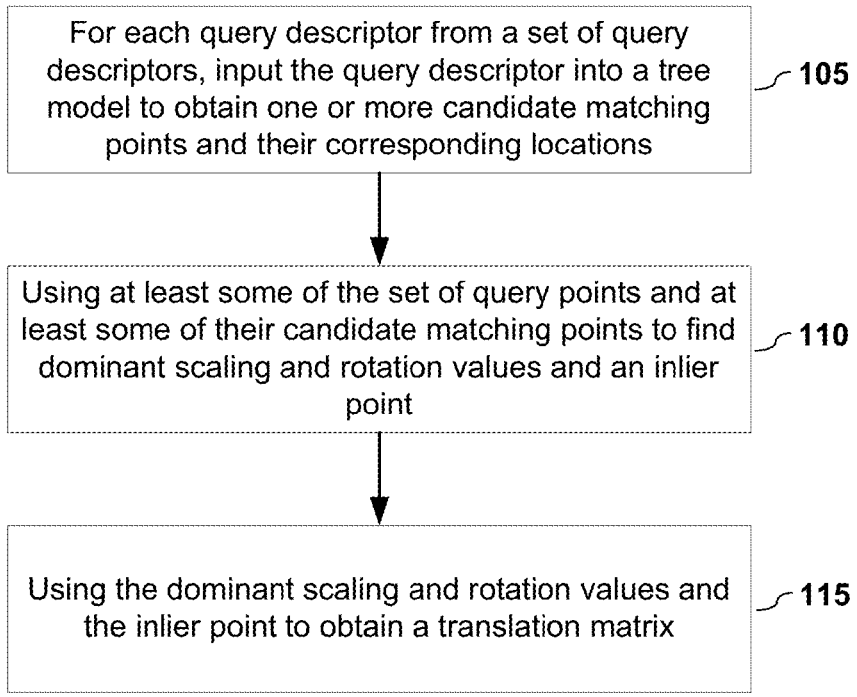
FIG. 1 depicts an overview of point set matching according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize that certain steps may be performed in different orders, including being done contemporaneously.

It shall be noted that although embodiments described herein may be within the context of object detection in images (still or video), the invention elements of the current patent document are not so limited. Accordingly, the invention elements may be applied or adapted for use in other contexts and/or on other input sensor data.

1. Introduction

As noted above, there are several issues with traditional point set matching approaches. For example, candidate pairs may be returned from a tree such that multiple descriptors may get quantized to a leaf node containing multiple descriptor locations from the same training image, which therefore forms a many-to-many matching problem. Also, traditional point set matching performance suffers in the presence of large ratios of outliers. One solution is to select only the top-most pairing for each query descriptor, which might falsely reject inlier descriptors. Alternatively, one can regard such many-to-many matching to multiple one-to-one matching at the cost of additional computation for outlier detection, or by imposing strict limitations on the transformation space. For instance, "region-to-image" matching has been introduced where descriptors from each image segment are matched to a database image using Dynamic Programming. However, such an approach is not a general solution—no rotation and only small amount of scaling are allowed.

2. Matching Point Set Returned by Tree Model

Embodiments of the present invention take a more general approach then some of the prior approaches—the translation is assumed to follow 2D similitude transform that includes scaling, rotation, and translation transforms. Embodiments of the present invention solve the parameters for each of the primitive transform separately to allow for very efficient computation in quadratic time.

FIG. 1 depicts an overview of point set matching 100 according to embodiments of the present invention. In embodiments, point set matching starts by using local descriptor similarity matching to construct a set of candidate matching pairs. In embodiments, a vocabulary tree model may be used to initially construct a set of candidate matching pairs. A tree model is widely adopted for point set matching with local image descriptors due to its efficiency and scalability. The advantages allow its performance to be further boosted by simply increasing the training sample size.

In embodiments, a typical vocabulary tree may be built in two steps, which are well known to those of ordinary skill in the art. First, a construction step builds a tree with descriptors from training images. And second, a registration step creates a Reverse Index (RI) table for each leaf node. In embodiments, the RI comprises one or more attributes of the image (class or identifier) with at least one descriptor that reaches the leaf node. In embodiments, the RI also includes the locations of the descriptors, which may be referred to herein as a "point." Thus, in embodiments, during the training process, a tree model is built and registered in which each leaf node has a list that indexes all objects with at least one descriptor that reaches the leaf and the 2D location of the descriptor.

Figure 2:
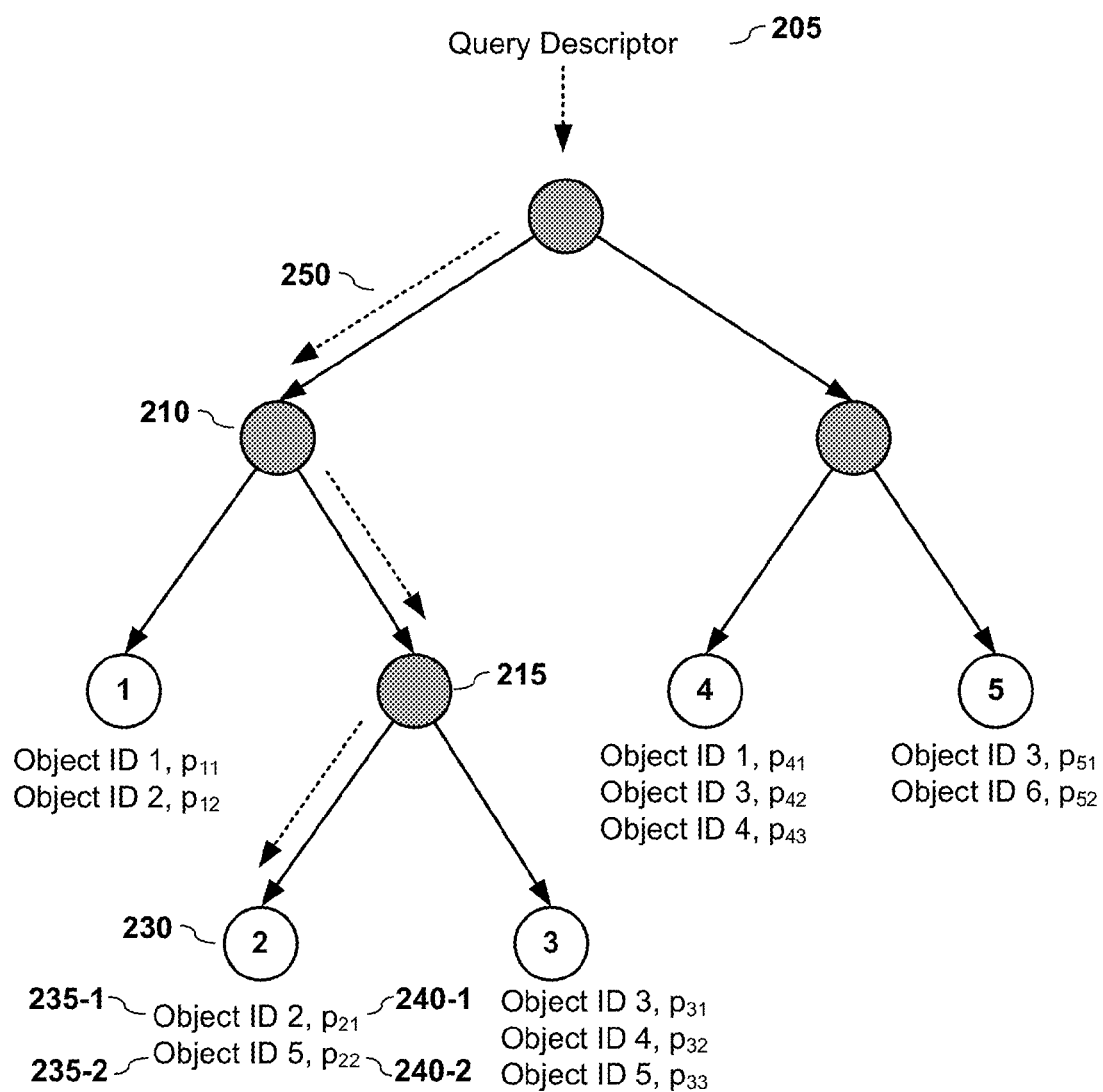
FIG. 2 graphically depicts a tree model used to obtain candidate matching points for a query descriptor according to embodiments of the present invention.

Returning to FIG. 1, Step 105, the query process begins by quantizing each query descriptor to the closest leaf node in a trained tree model. FIG. 2 graphically depicts a tree model used to obtain candidate matching points for a query descriptor 200 according to embodiments of the present invention. In embodiments, the query descriptor 205 is input into the tree model, and based upon a comparison of descriptor values, the query descriptor progresses 250 until it reaches a leaf node 230 that most closely resembles the query descriptor 205. As seen in FIG. 2, associated with the leaf node is a reverse index that includes information about the candidate matching point or points. In this example, there are two candidate matching points. One point has one object identifier, Object ID 2 (235-1) and an associated location, $p_{21}$ (240-1); the other point has a different object identifier, Object ID 5 (235-2), along with its associated location, $p_{22}$ (240-2). It shall be noted that, in embodiments, the reverse index may include additional information.

Thus, for each query descriptor from a set of query descriptors, the query descriptor is input (105) into a tree model to identify its closest leaf node and thereby obtain one or more candidate matching points and their corresponding locations from the reverse index for that leaf node. Stated generally, in embodiments, given a set of M descriptors, their 2D locations may be depicted as $P=[p1; p2; \ldots ; pM] \in \mathcal{R}$. The tree finds the set of matching candidates for each image class l denoted as $Q_l = [\{q\}_1; \{q\}_2; \ldots ; \{q\}_M]_l$, where each $\{q\}_h$ may be a set of points. For simplicity, the subscript l is omitted.

In embodiments, the query points and their corresponding candidate matching points may then be used to obtain an estimate of a transformation model. A similitude transform is typically of the form:

$$q = \alpha p \begin{bmatrix} \cos(\theta) & \sin(\theta) \\ -\sin(\theta) & \cos(\theta) \end{bmatrix} + t = \alpha x R + t,$$

where $\alpha$ is a scalar representing scaling, t is the translation vector/matrix, $\theta$ is the rotation angle, and R is the rotation matrix.

In embodiments, at least some of the set of points and at least some of their candidate matching points are used (110) to find dominant scaling and rotation values and an inlier point. Then, using the dominant scaling and rotation values and the inlier descriptor, a translation matrix is obtained (115). It shall be noted that this novel approach to obtaining the similitude transform has several benefits, including but not limited to eliminating or ameliorating the issues that plagued prior approaches. The next subsections describe, in more detail, embodiments for obtaining the scaling and rotation values, and for obtaining the translation matrix.

a. Scaling and Rotation in Parameter Space

Embodiments of the point set matching of the present invention are based on the recognition that the scaling and the rotation may be calculated separately from the translation, because the former two are invariant to the origin. In embodiments, $\alpha$ and R (or $\theta$) may be solved by:

$$R^*, \alpha^* = \underset{R,\alpha}{\operatorname{argmin}} \|\alpha \bar{P} R - \bar{Q}\|_F^2, \quad (1)$$

s.t. $RR^T = I$ where $\bar{P}$ are the centralized version of query P, and $\bar{Q}$ are the corresponding centralized matching points. To solve Eq.(1), since $$\|\alpha \bar{P}R - \bar{Q}\|_F^2 \propto \alpha^2 Tr(\bar{P}\bar{P}^T) - 2\alpha Tr(\bar{P}R\bar{Q}^T), \qquad (2)$$

taking Eq.(2) into Eq.(1), R and $\alpha$ may be solved successively by first finding $$R^* = \underset{R}{\operatorname{argmax}} Tr(\bar{P}R\bar{Q}^T), \qquad (3)$$
s.t. $RR^T = I$ and then $$\alpha^* = \operatorname{mean}\left(\frac{\bar{Q}}{\bar{P}R^*}\right) \qquad (4)$$

Eq.(3) is an orthogonal approximation problem, and $R^* = U\tilde{S}V^T$ (if reflection transform is allowed, then
$R^* = UV^T$) (5)

where $\{U, S, V\}$ are the Singular Vector Decomposition (SVD) of $\bar{P}^T\bar{Q}$, and $$\tilde{S} = \begin{bmatrix} 1 & 0 \\ 0 & \det(UV^T) \end{bmatrix}$$

Finally, $$\theta^* = \arctan\frac{R_{1,1}^*}{R_{1,2}^*} \qquad (6)$$

Eq.(3) and Eq.(4) show that, with any two matching pairs, the optimal scaling and rotation may be solved in constant time. This makes it possible, in embodiments, to find a dominant scaling and rotation from noisy point pairs and multiple matching candidates using Hough transform. In embodiments, to depict, a 2D parameter space may be constructed for scale $\alpha$ and rotation angle $\theta$ respectively; multiple subsets may be sampled, each with at least two matching pairs between P and Q, to accumulate score for a $\{\alpha, \theta\}$ combination. For n subsamples, the complexity is $O(n^2)$.

Figure 3:
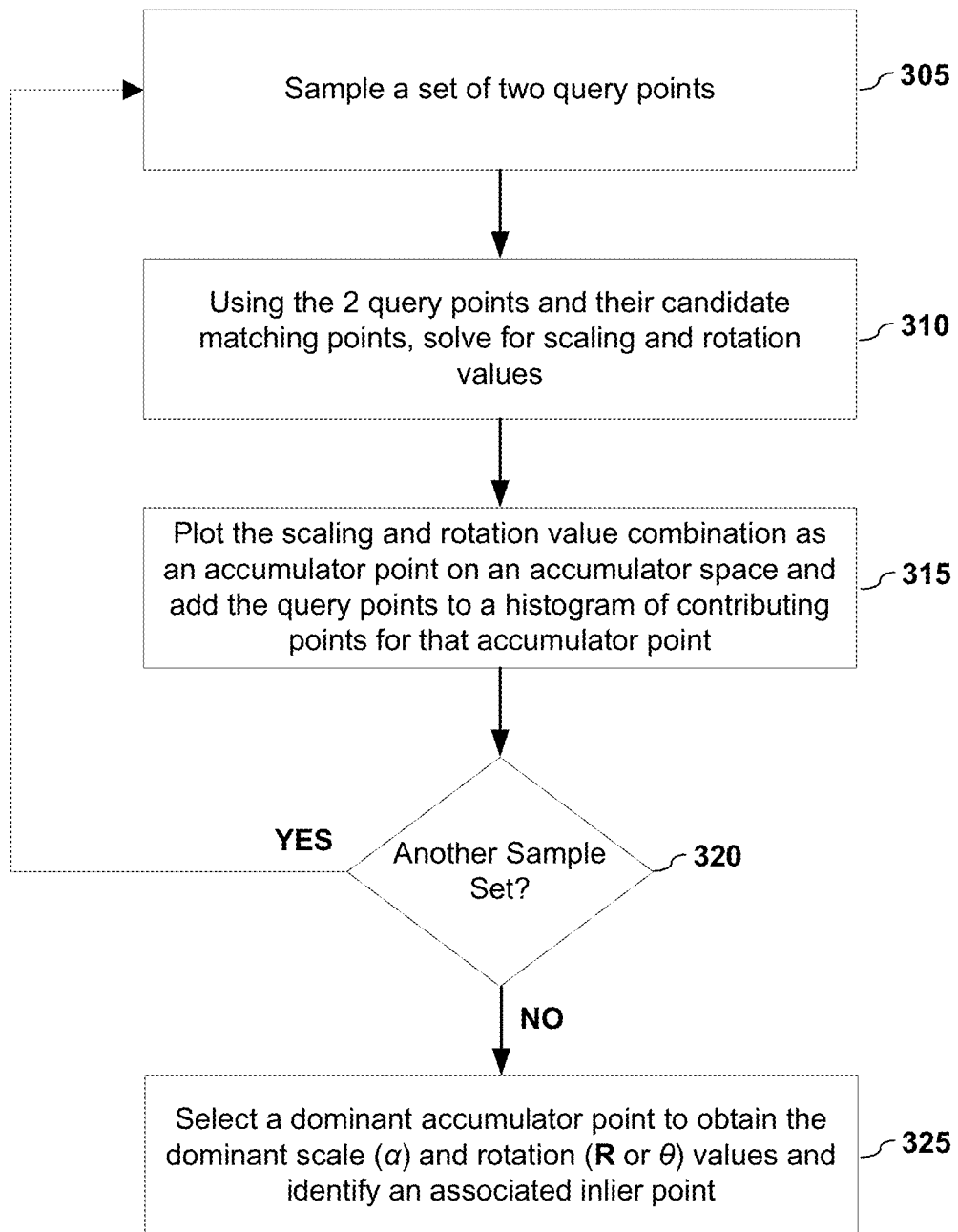
FIG. 3 depicts a method for obtaining a dominant scale and rotation values according to embodiments of the present invention.

FIG. 3 depicts a method for obtaining a dominant scale and rotation combination 300 according to embodiments of the present invention. As depicted in FIG. 3, the method commences by sampling (305) two query points. Using the two query points and their candidate matching points, the scaling and rotation values are solved for (310) as presented above. In embodiments, the values are used to plot (315) a scale-rotation combination accumulator point onto an accumulator space with scale and rotation axes. Also, in embodiments, a histogram, table, or other mechanism used to track which sampled points produced the accumulator space point is also updated (315). In embodiments, steps 305-315 may be repeated (320) a number of times, in which another two sampled query points are used. One skilled in the art shall recognize that the embodiment of FIG. 3 may be altered regard when and how the sampling is done and processed (e.g., batch processing) without materially altering the concept of generating a set of accumulator points.

Figure 4:
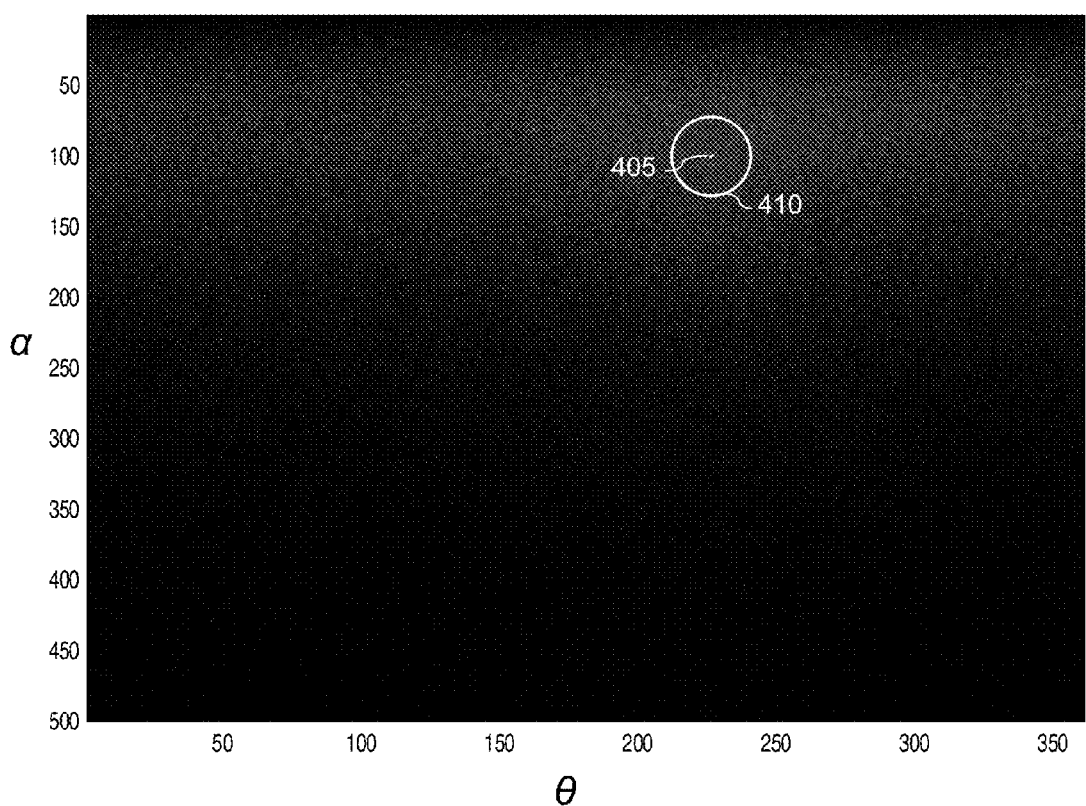
FIG. 4 illustrates an example of a parameter space 400 according to embodiments of the present invention.

FIG. 4 illustrates an example of a parameter space/accumulator space 400 according to embodiments of the present invention. As shown in FIG. 4, the accumulator space 400 is constructed using scale (y-axis) and rotation angle ($\theta$) (x-axis). In embodiments, for each sampled set of points that yields scale and rotation values, a point is plotted in the accumulator space using the scale and rotation values. In embodiments, a dominant point is identified (325), such as point 405 within circle 410 (which is shown to help highlight point 405). In embodiments, the dominant point may be the mode point. In alternative embodiment, an average or weighted average of a set of accumulator points may be used to identify (325) dominant scale and rotation values.

In embodiments, having identified a dominant accumulator point, the histogram, table, or other mechanism that correlates the sampled query points to accumulator points, is used to identify a corresponding query point that generated (or, in embodiments, most closely generates) the dominant accumulator point. This identified point may be referred to herein as an "inlier" point, meaning that it is most probably not an outlier point. In embodiments, this inlier point may be used to help generate the translation matrix, as explained in more detailed below.

b. Translation and Outlier Detection

In embodiments, the next stages involve detecting outliers and calculating an optimal translation. In embodiments, the property that scaling and rotation are invariant to origin, such that the translation with respect to arbitrary origin should project the inliers to locations with constant offset from the matched targets, while outliers should have inconstant offsets, is relied upon to obtain the translation matrix. Using this property, this subsection presents embodiments of a method for calculating the translation in constant time.

Embodiments of the present invention are based on two additional facts. First, if the arbitrary origin is set to one of the inliers, then the constant offset becomes zero because scaling and rotation transformation with respect to this point would project all the inliers exactly onto the matched target. And second, the maxima available in the scaling/rotation parameter space (as discussed in the prior section) guarantee the existence of at least one "inlier."

FIG. 5 depicts a method for obtaining a translation matrix 500 according to embodiments of the present invention. In embodiments, the method commences by using the dominant scale and rotation values and inlier point obtained from the prior section to project (505) a set of query points. Denoting the inlier point as $p_0$ and its corresponding target as $q_0$, the optimal transformation should project each query point $p_i$ to:

$$\tilde{p}_i = \alpha(p_i - p_0)*R + q_0. \qquad (7)$$

Now, in embodiments, outliers can be detected by simply thresholding (510) the alignment error between $\tilde{p}_i$ and $q_i$. After all the inliers P* and Q* are detected (510), a set of inlier points (which may be all or a subset of the inliers) may be used to solve (515) for translation (t). In embodiments, the optimal translation vector may be calculated as:

$$t^* = \bar{q}^* - \alpha^* \bar{p}^* R^*, \qquad (8)$$

where $\bar{p}^*$ and $\bar{q}^*$ are the centers of P* and Q* respectively.

In embodiments, the strategy may also be applied for cases where $p_i$ has multi-candidate targets $\{q\}_i$. In such situation, an embodiment may comprise simply thresholding the distance between $p_{proj}$ and the closest $q_i$.

c. Multi-Mode in the Parameter Space

In many real-world applications that, besides one single optimal transformation between point sets, there are chances that additional transformations exists in the "outliers," which causes the multiple modes matching problem. These additional transforms may be detected to identify a more complete set of "inlier," and hence to improve performance.

Figure 6A:
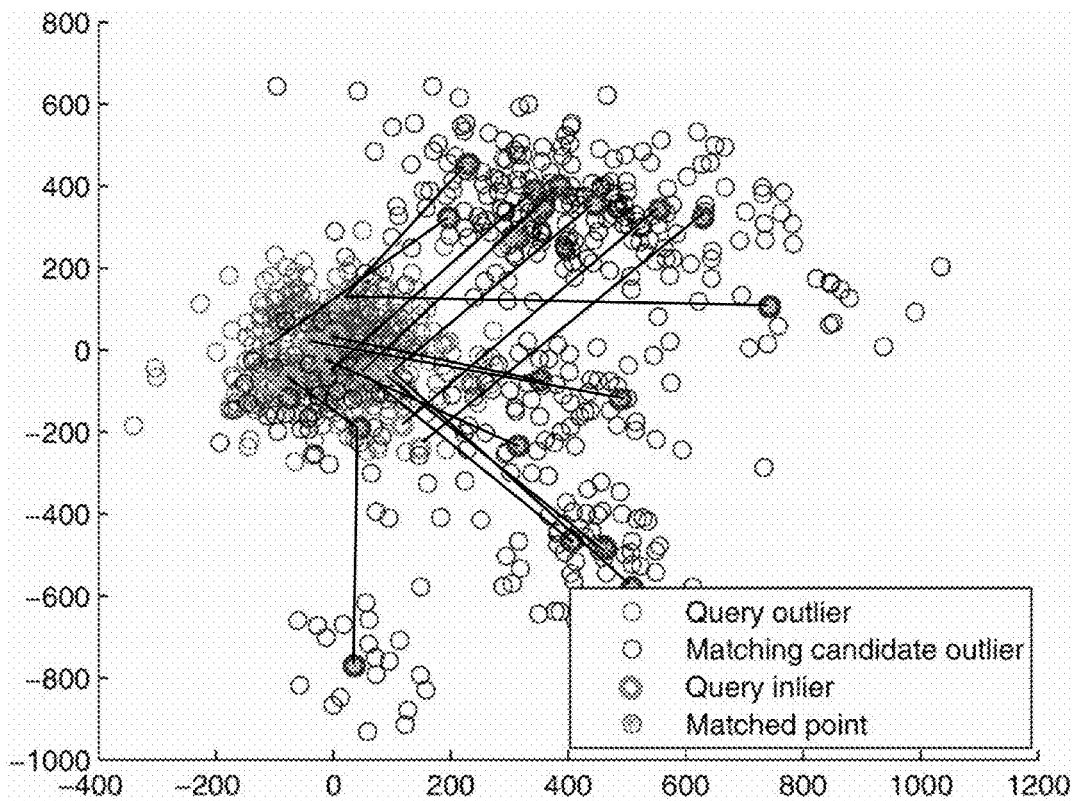
FIG. 6(a) illustrates a set of matching results in which there is multi-mode matching according to embodiments of the present invention.
Figure 6B:
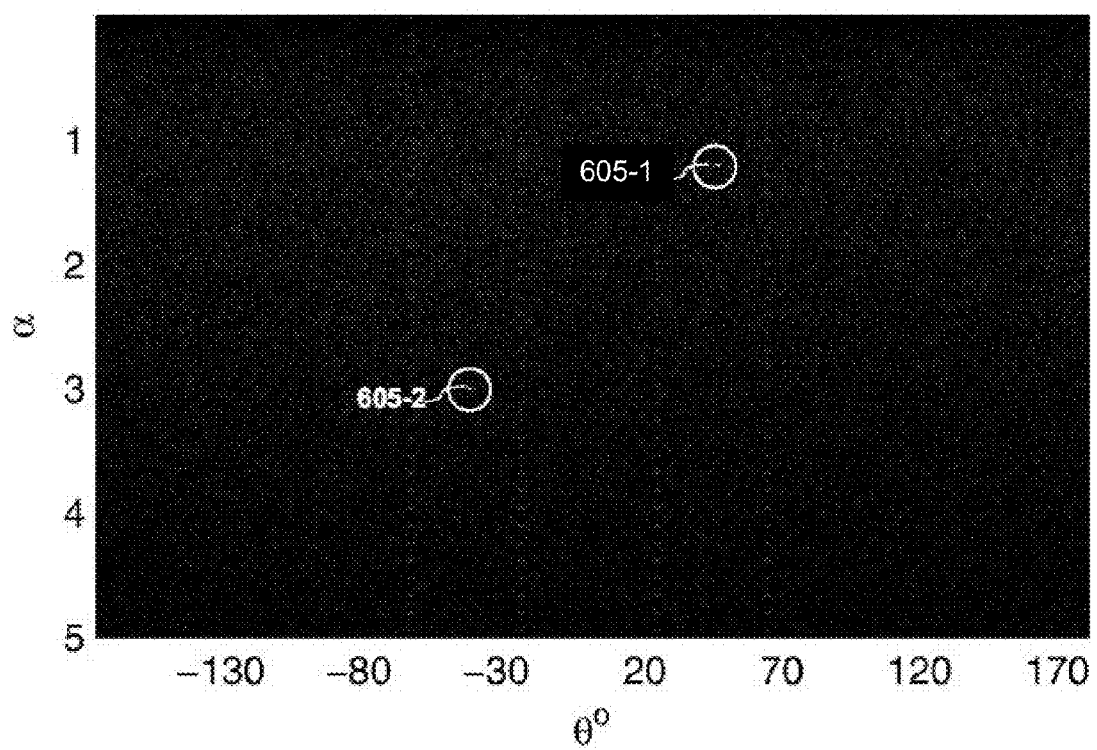
FIG. 6(b) illustrates the multiple mode dominant scaling/rotation values according to embodiments of the present invention.

Identifying transformation with multi-mode can be well achieved in the scaling/rotation parameter space (as discussed in subsection 2.a.), because each local maxima corresponds to one mode, and the value of the maxima tells the lower bound of the number of matched pairs that can be covered by the transformation. In this way, a user can specify the minimal number of points to form a transform, based on an 8-point criteria, 7-point criteria, or at least 3 points for 2D affine. By iterating local maxima that satisfy the criteria, all modes existing in the point set can be identified, as illustrated in FIG. 6. FIG. 6 illustrates matching situation with multiple modes according to embodiments of the present invention. FIG. 6(a) illustrates a set of matching results in which there is multi-mode matching 600A. And, FIG. 6(b) illustrates the multiple mode dominant scaling/rotation values 600B. In the depicted example, the two ground-truth translations for inliers are: $\{\alpha=1.2, \theta=45°, t=[300, 400]\}$ (605-1) and $\{\alpha=3, \theta=-45°, t=[400, -200]\}$ (605-2). The complexity to calculate k transformations is simply $O(n^2+k)$ because the scaling/rotation space does not need to be reconstruct.

3. Performance

Results are presented herein to demonstrate possession of the inventive aspects presented in the current patent document and to demonstrate its improved results over prior methods. These results were performed using specific embodiments and under specific conditions; accordingly, nothing in these results sections shall be used to limit the inventions of the present patent document. Rather, the inventions of the present patent document shall embrace all alternatives, modifications, applications and variations as may fall within the spirit and scope of the disclosure.

Figure 7:
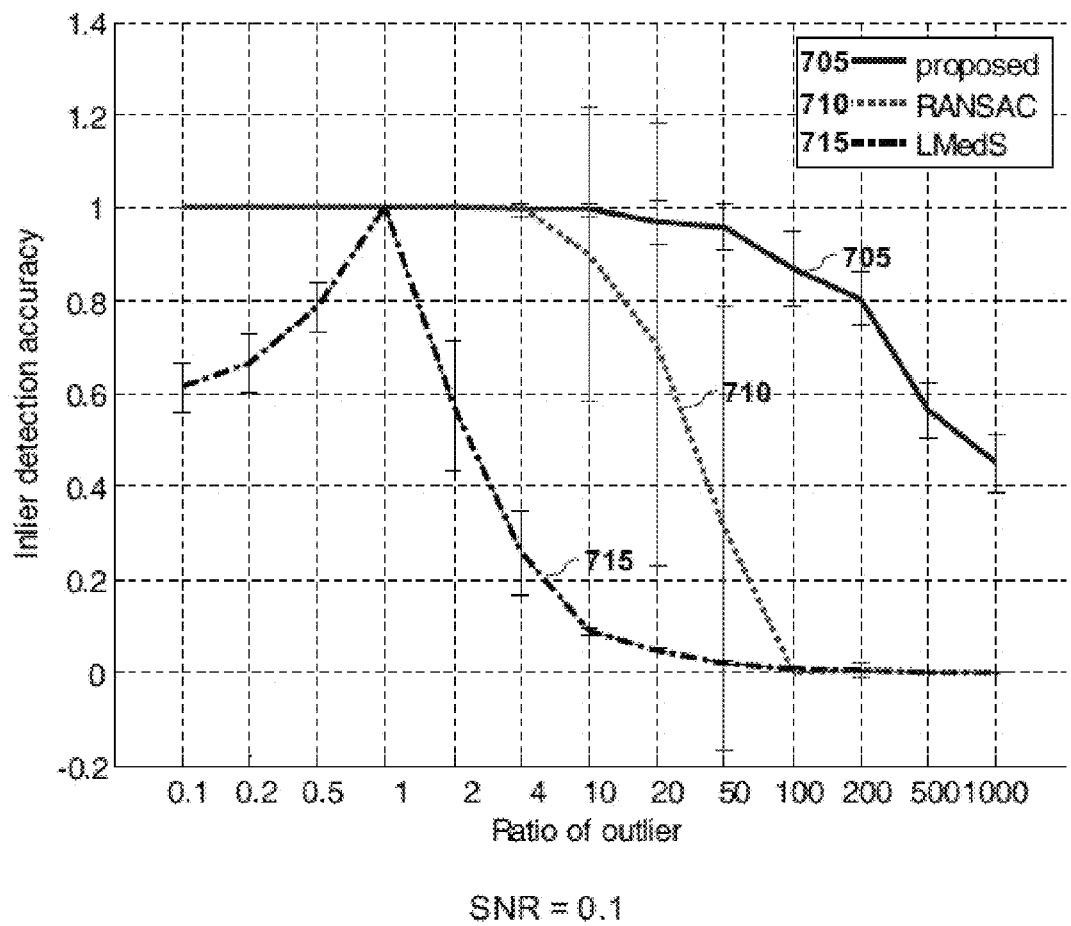
FIG. 7 illustrates performance of an embodiment of the current invention against benchmark techniques RANSAC and LMedS.
Figure 8:
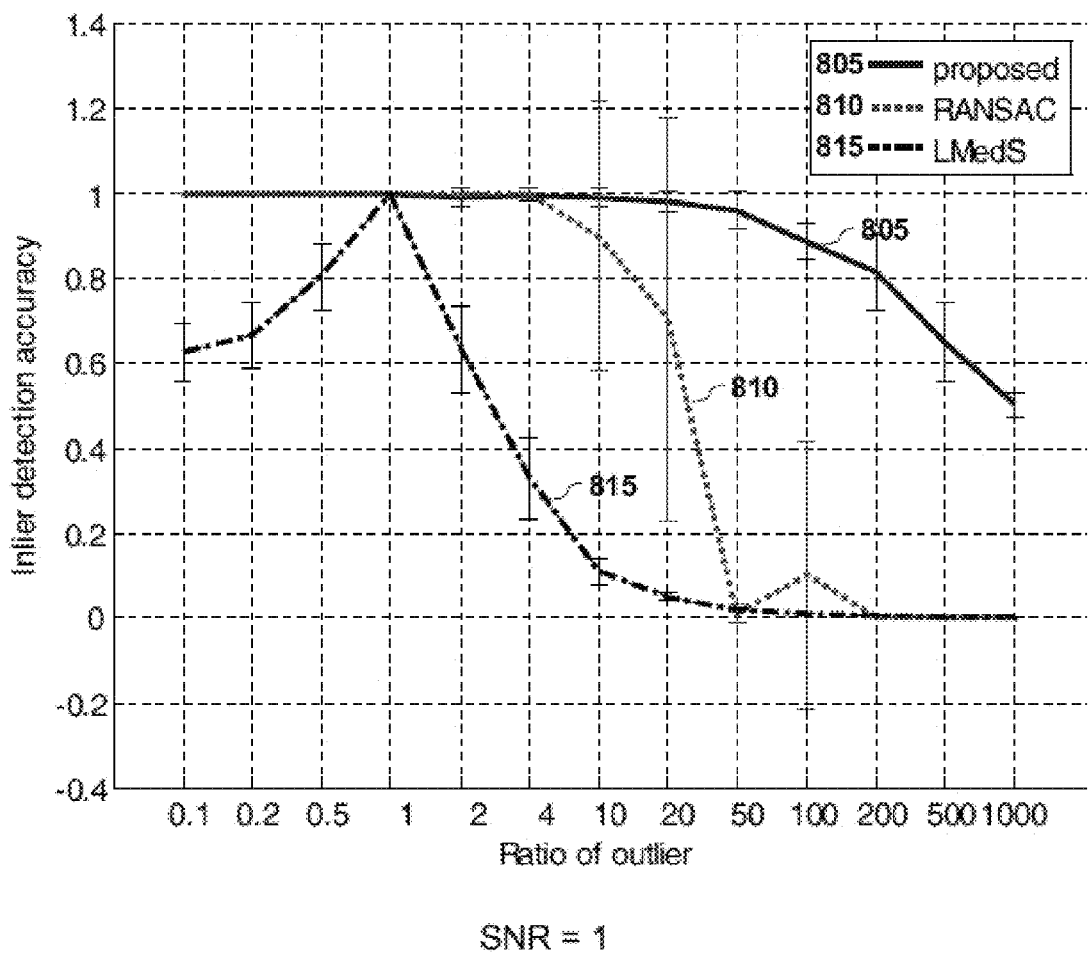
FIG. 8 also illustrates performance of an embodiment of the current invention against benchmark techniques RANSAC and LMedS.

FIGS. 7 and 8 show performance of embodiments of the current invention against benchmark techniques RANSAC and LMedS subject to different ratios of outliers. The performance was evaluated using an inlier detection accuracy, which was calculated according to the following formula:

$$acc = \frac{\text{true positive}}{\text{true positive} + \text{false negative} + \text{false positive}} \quad (9)$$

Both FIG. 7 and FIG. 8 graphically illustrate that embodiments of the present invention outperformed benchmark techniques RANSAC and LMedS, particularly at higher ratios of outliers. In FIGS. 7 and 8, the curves 705 and 805 are representative of embodiments of the present invention; curves 710 and 810 are indicative of RANSAC and 715 and 815 of LMedS.

Figure 9:
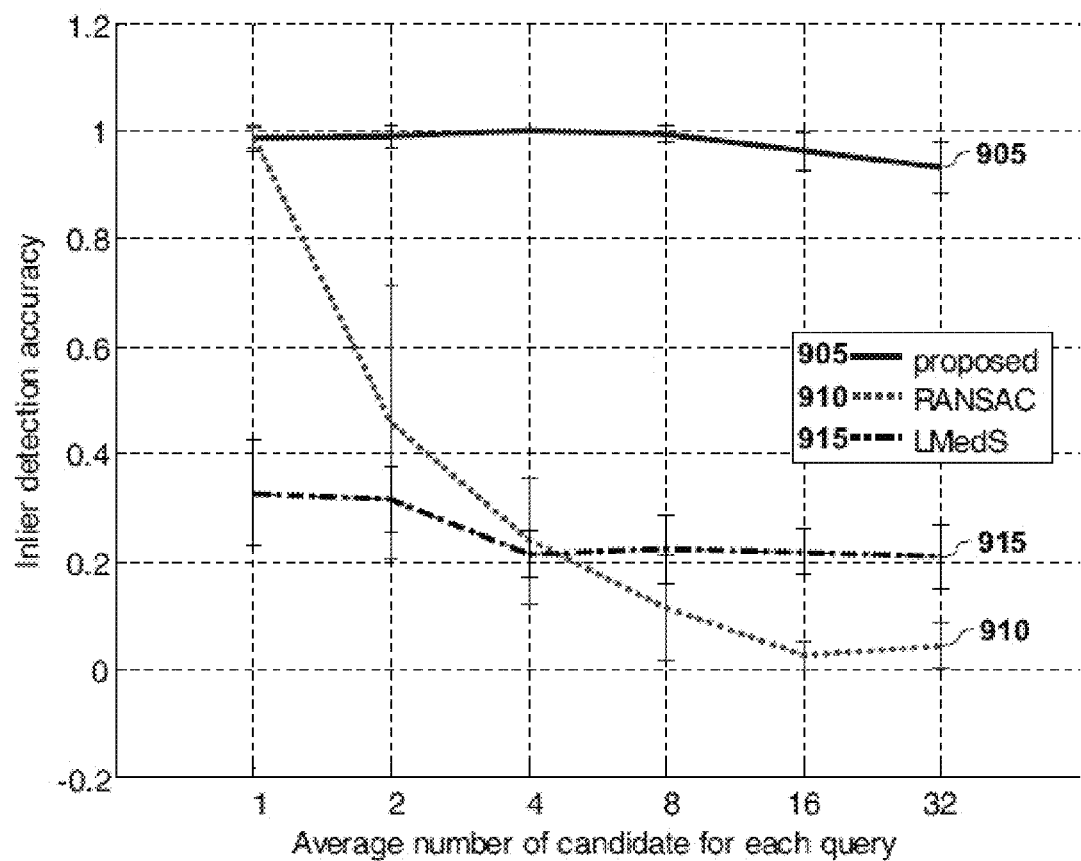
FIG. 9 illustrates performance of an embodiment of the current invention against benchmark techniques RANSAC and LMedS relative to average number of candidates for each query.

FIG. 9 also illustrates performance of an embodiment of the current invention against benchmark techniques RANSAC and LMedS. The performance was evaluated using the inlier detection accuracy relative to average number of candidates for each query. Once again, the present invention outperformed the benchmark techniques, particularly at higher average number of candidates for each query. Curve 905 is representative of embodiments of the present invention, curve 910 of RANSAC and curve 915 of LMedS.

It shall be noted that computation complexity for embodiments of the present invention is better than traditional approaches. In embodiments, the scale and rotation may be solved in $O(n^2)$ where n is the number of points, and the translation may be solved in $O(nm)$ where m is the average number of candidates for each query point.

4. Computing System Embodiments

Figure 10:
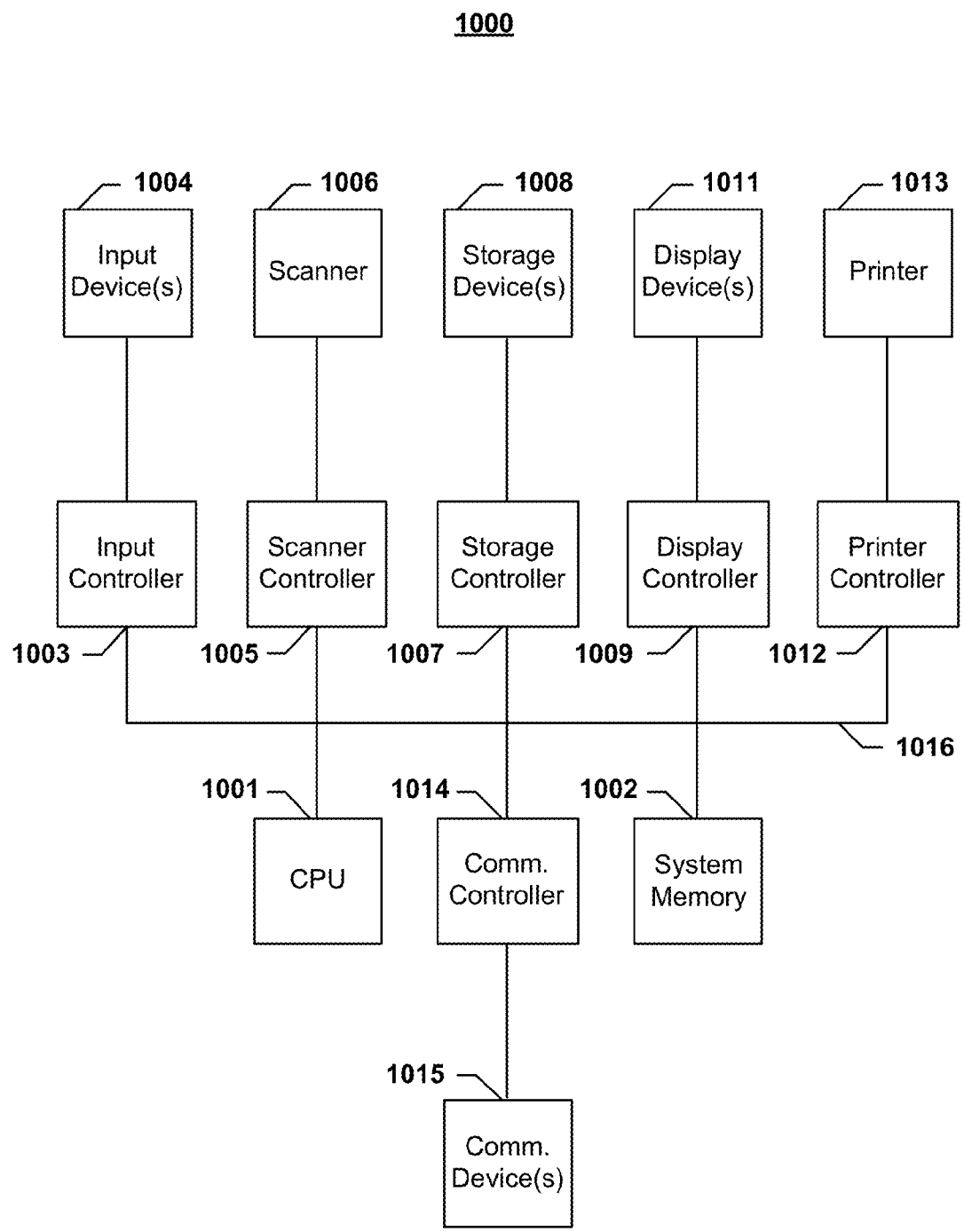
FIG. 10 depicts a block diagram illustrating an exemplary system which may be used to implement aspects of the present invention.

Having described the details of the invention, an exemplary system 1000, which may be used to implement one or more aspects of the present invention, will now be described with reference to FIG. 10. As illustrated in FIG. 10, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), a thin film transistor (TFT) display, or other type of display. The system 1000 may also include a printer controller 1012 for communicating with a printer 1013. A communications controller 1014 may interface with one or more communication devices 1015, which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications and variations as may fall within the spirit and scope of the appended claims.

What is claimed is:

1. A computer-implemented method for point set matching, the method comprising:
   for each point from a set of points, each point being associated with a location and a descriptor, inputting the point's descriptor into a tree model to obtain one or more candidate matching points;
   using at least some of the set of points and at least some of their candidate matching points to find dominant scaling and rotation values and an inlier point selected from at least some of the set of points; and
   obtaining a translation matrix using the dominant scaling and rotation values, the inlier point, and at least some of the set of points and at least some of their candidate matching points.

2. The computer-implemented method of claim 1 wherein the tree model is a vocabulary tree comprising a set of leaf nodes based upon descriptors and a reverse index comprising, for each leaf node, a listing of one or more candidate matching points associated with that leaf node, each candidate matching point comprising a location and an identifier.

3. The computer-implemented method of claim 2 wherein the at least some of their candidate matching points, in the step of using at least some of the set of points and at least some of their candidate matching points to find dominant scaling and rotation values and an inlier point, have a same identifier.

4. The computer-implemented method of claim 2 wherein the step of using at least some of the set of points and at least some of their candidate matching points to find dominant scaling and rotation values and an inlier point selected from at least some of the set of points comprises:
   for each of a plurality of sample sets of at least two points from the set of points:
      solving for a scaling value and a rotation value using the locations of the points in the sample set and the locations of at least some of the points' corresponding candidate matching points;
      plotting a value corresponding to the scaling value and rotation value onto an accumulator space; and
      associating the points from the sample set with that accumulator space value;
   selecting the dominant scale and rotation values from the accumulator space as being the scale and rotation values that form the most frequent accumulator space value; and
   selecting the inlier point from among the points associated with the most frequent accumulator space value.

5. The computer-implemented method of claim 4 wherein the selected inlier point is the point that has been associated with the most frequent accumulator space value the most frequent number of times.

6. The computer-implemented method of claim 1 wherein the step of obtaining a translation matrix using the dominant scaling and rotation values, the inlier point, and at least some of the set of points and at least some of their candidate matching points comprises:
   for each of a group of points selected from the at least some of the set of points:
      using the dominant scale and rotation values and the inlier point to project the group of points;
      identifying at least some of the points from the group of points that have a projection location that is within a threshold distance of its corresponding candidate matching point's location;
      selecting at least some of the identified points as a set of inlier points; and
      using the set of selected inlier points to solve for the translation matrix.

7. The computer-implement method of claim 6 further comprising:
   identifying as outliers at least some of the points from the group of points that do not have a projection location that is within a threshold distance of its corresponding candidate matching point's location.

8. The computer-implemented method of claim 6 wherein the points for the group of points are chosen based upon being associated with a superpixel region.

9. A non-transitory computer-readable medium or media comprising one or more sequences of instructions which, when executed by one or more processors, causes steps to perform the method claim 1.

10. A computer-implemented method for obtaining a similitude transform comprising a scaling factor, a rotation factor, and a translation matrix using a set of query points and a set of corresponding candidate matching points, the method comprising:
   calculating a scaling factor and a rotation factor using locations of a set of at least two points selected from the set of query points and locations of their corresponding candidate matching points;
   calculating a translation matrix by performing the steps comprising:
      projecting a group of query points selected from the set of query points using the scaling factor, the rotation factor, and one of the points from the set of at least two points;
      selecting at least some of the query points from the group of query points, wherein each selected query point has a projection location that is within a threshold distance of its corresponding candidate matching point's location; and
      using the selected at least some query points and their corresponding candidate matching points to solve for the translation matrix.

11. The computer-implemented method of claim 10 wherein each point of the set of query points has an associated descriptor and wherein the set of corresponding candidate matching points are obtained by:

for each point from the set of query points, inputting the point's descriptor into a tree model to obtain one or more candidate matching points.

12. The computer-implemented method of claim 11 wherein the tree model is a tree comprising a set of leaf nodes based upon descriptors and a reverse index comprising, for each leaf node, a listing of one or more candidate matching points associated with that leaf node, each candidate matching point comprising a location and an identifier.

13. The computer-implemented method of claim 10 wherein the step of calculating a scaling factor and a rotation factor using locations of a set of at least two points selected from the set of query points and locations of their corresponding candidate matching points comprises:

for each of a plurality of sample sets of at least two points from the set of query points:
  solving for a scaling factor and a rotation factor using the locations of the points in the sample set and the locations of the points' corresponding candidate matching points;
  plotting a value corresponding to the scaling factor and rotation factor onto an accumulator space; and
  associating the points from the sample set with that accumulator space value; and
selecting the dominant scale and rotation factors from the accumulator space as being the scale and rotation factors that form the dominant accumulator space value; and
selecting as the one point from the set of at least two points, the point associated with the dominant accumulator space value.

14. A non-transitory computer-readable medium or media comprising one or more sequences of instructions which, when executed by one or more processors, causes steps to perform the method claim 10.

15. A system for detecting an object in an image, the system comprising:
one or more processors; and
a non-transitory computer-readable medium or media comprising one or more sequences of instructions which, when executed by the one or more processors, causes steps to be performed comprising:
  for each point from a set of points, each point being associated with a location and a descriptor, inputting the point's descriptor into a tree model to obtain one or more candidate matching points;
  using at least some of the set of points and at least some of their candidate matching points to find dominant scaling and rotation values and an inlier point selected from at least some of the set of points; and
  obtaining a translation matrix using the dominant scaling and rotation values, the inlier point, and at least some of the set of points and at least some of their candidate matching points.

16. The system of claim 15 wherein the tree model is a vocabulary tree comprising a set of leaf nodes based upon descriptors and a reverse index comprising, for each leaf node, a listing of one or more candidate matching points associated with that leaf node, each candidate matching point comprising a location and an identifier.

17. The system of claim 16 wherein the at least some of their candidate matching points, in the step of using at least some of the set of points and at least some of their candidate matching points to find dominant scaling and rotation values and an inlier point, all share a same identifier.

18. The system of claim 16 wherein the step of using at least some of the set of points and at least some of their candidate matching points to find dominant scaling and rotation values and an inlier point selected from at least some of the set of points comprises:

for each of a plurality of sample sets of at least two points from the set of points:
  solving for a scaling value and a rotation value using the locations of the points in the sample set and the locations of at least some of the points' corresponding candidate matching points;
  plotting a value corresponding to the scaling value and rotation value onto an accumulator space; and
  associating the points from the sample set with that accumulator space value;
selecting the dominant scale and rotation values from the accumulator space as being the scale and rotation values that form the dominant accumulator space value; and
selecting the inlier point from among the points associated with the dominant accumulator space value.

19. The system of claim 18 wherein the selected inlier point is the point that has been associated with the dominant accumulator space value the highest number of times.

20. The system of claim 15 wherein the step of obtaining a translation matrix using the dominant scaling and rotation values, the inlier point, and at least some of the set of points and at least some of their candidate matching points comprises:

for each of a group of points selected from the at least some of the set of points:
  using the dominant scale and rotation values and the inlier point to project the group of points;
  identifying at least some of the points from the group of points that have a projection location that is within a threshold distance of its corresponding candidate matching point's location;
  selecting at least some of the identified points as a set of inlier points; and
  using the set of selected inlier points to solve for the translation matrix.

* * * * *